United States Patent
Naumovitz

(10) Patent No.: US 7,146,764 B1
(45) Date of Patent: Dec. 12, 2006

(54) RATTLE CAGE FISHING LURE

(76) Inventor: Gary Naumovitz, 2199 SW. Gray Beal Ave., Port St. Lucie, FL (US) 34953

( * ) Notice: Subject to any disclaimer, the term of this patent is extended or adjusted under 35 U.S.C. 154(b) by 0 days.

(21) Appl. No.: 11/190,480

(22) Filed: Jul. 27, 2005

(51) Int. Cl.
*A01K 85/00* (2006.01)
*A01K 85/01* (2006.01)

(52) U.S. Cl. .................. 43/42.31; 43/42.06; 43/41; 43/44.99

(58) Field of Classification Search ............... 43/42.08, 43/42.37, 42.5, 42.44, 42.31, 42.06, 42.35, 43/41, 44.9
See application file for complete search history.

(56) References Cited

U.S. PATENT DOCUMENTS

| | | | | |
|---|---|---|---|---|
| 2,008,004 A | * | 7/1935 | Catarau | 43/42.06 |
| 2,468,988 A | * | 5/1949 | Lobdell | 43/42.38 |
| 2,556,634 A | * | 6/1951 | Redinger | 43/41 |
| 2,719,382 A | * | 10/1955 | Schachte | 43/44.99 |
| 2,765,575 A | * | 10/1956 | Gfroerer | 43/44.99 |
| 2,983,065 A | * | 5/1961 | Ferguson et al. | 43/42.09 |
| 4,177,598 A | | 12/1979 | Jolley | |
| 5,054,230 A | | 10/1991 | Woodman | |
| 5,216,829 A | | 6/1993 | Morton | |
| 5,319,875 A | * | 6/1994 | Brandolino | 43/42.06 |
| 5,355,616 A | * | 10/1994 | Parker | 43/43.14 |
| 5,870,850 A | * | 2/1999 | Gramse, Jr. | 43/42.31 |
| 5,926,995 A | * | 7/1999 | Dubois | 43/42.31 |
| 6,354,037 B1 | * | 3/2002 | Coppola, Jr. | 43/42.06 |
| 6,557,293 B1 | * | 5/2003 | Klapka | 43/42.06 |
| 6,651,376 B1 | * | 11/2003 | Link | 43/42.31 |
| D514,660 S | * | 2/2006 | Murrell | D22/136 |
| 2006/0042150 A1 | * | 3/2006 | Roh | 43/42.37 |

* cited by examiner

*Primary Examiner*—Darren W. Ark
*Assistant Examiner*—John D. Holman
(74) *Attorney, Agent, or Firm*—Michael I. Kroll

(57) ABSTRACT

Apparatus 10 discloses a fishing lure having a cage 16 that water 12 can move through with movable elements 20 therein which are free to move laterally and transversely within the case. When placed in a medium such as water 12, the beads 20 banging into each other and the cage 16 generate sound waves 22 that radiate from the lure, attracting game fish 14. The cage 16 can vary in shape, such as cylindrical or polygonal but preferably cylindrical. In addition, varying the materials used for the beads 20, such as glass and metal would cause the beads to vary an activity.

7 Claims, 10 Drawing Sheets

RATTLE CAGE FISHING LURE

BACKGROUND OF THE INVENTION

1. Field of the Invention

The present invention relates generally to fishing lures and, more specifically, to a fishing lure having a cage that water can move through with movable elements therein, which are free to move laterally and transversely within the cage. When placed in a medium such as water, the beads banging into each other and the cage generate sound waves that radiate from the lure, attracting game fish. The cage can vary in shape, such as cylindrical or polygonal but preferably cylindrical. In addition, varying the materials used for the beads, such as glass and metal would cause the beads to vary in activity.

2. Description of the Prior Art

There are other fishing lures designed for the same purpose. Typical of these is U.S. Pat. No. 2,556,634 issued to Redinger on Jun. 12, 1951.

Another patent was issued to Schachete on Oct. 4, 1955 as U.S. Pat. No. 2,719,382. Yet another U.S. Pat. No. 2,765,575 was issued to Gfroerer on Oct. 9, 1956 and still yet another was issued on Dec. 11, 1979 to Jolley as U.S. Pat. No. 4,177,598.

Another patent was issued to Woodman on Oct. 8, 1991 as U.S. Pat. No. 5,054,230. Yet another U.S. Pat. No. 5,216,829 was issued to Morton on Jun. 8, 1993. Another was issued to Brandolino on Jun. 14, 1994 as U.S. Pat. No. 5,319,875 and still yet another was issued on Oct. 18, 1994 to Parker U.S. Pat. No. 5,355,616.

Another patent was issued to Coppola Jr., on Mar. 12, 2002 as U.S. Pat. No. 6,354,037. Yet another U.S. Pat. No. 6,557,293 was issued to Klapka on May 6, 2003. Another was issued to Vinten on Sep. 8, 1910 as UK. Patent No. GB21,619 and still yet another was issued on Sep. 28, 1971 to Mounsey as UK Patent No. GB1,401,796.

U.S. Pat. No. 2,556,634

Inventor: Clarence V. Redinger

Issued: 12, Jun. 1951

A fishing lure comprising a one piece elongated hollow body open at its rear end and composed of a cylindrical wall portion and a convex segmented spherical front end wall portion of uniform thickness and provided with numerous perforations, the cylindrical wall portion having straight and parallel and diametrically opposed longitudinal bores entirely through the same, leaders extending through said bores and connected together in front of the body, fish hooks behind the body attached to the rear ends of said leaders and removable flat perforated closure disk in the rear end of the body U.S. Pat. No. 2,719,382

Inventor: George Schachte

Issued: 4, Oct. 1955

A multipurpose fishing device comprising an elongated rigid open ended tubular body having a multiplicity of perforations provided therein from end to end, top and bottom closing plugs fitted removably into and substantially closing the respective open ends to provide a container space therebetween.

U.S. Pat. No. 2,765,575

Inventor: Joseph Gfroerer

Issued: 9, Oct. 1956

A fishing lure formed of a body member having a chamber defined therein for receiving a dispersible bait, and at least one opening in a wall of the member to allow bait to escape from the chamber. The bait is pre-prepared and may be in any form, but is such that it will dissolve or be broken down by contact with water. The body member is arranged so that water can pass through the bait chamber so as to progressively dissolve or break down the body of bait contained therein, and carry that bait out of each escape opening. At least one barbed hook is attached to the body member. Check-valve means are mounted in the chamber to prevent inadvertent removal of the bait through the bait admitting aperture of the lure.

U.S. Pat. No. 4,177,598

Inventor: Kenneth Jolley

Issued: 11, Dec. 1979

A fishing lure hook up swivel is provided for coupling a ball-like element provided on one end of the fish line to a fish lure whereby the lure can rotate relative to the line. The swivel is provided with a solid body or receiver shaft having at one end thereof a ball recess and a slot leading into a bore for receiving the ball-like element and the line respectively. A coil spring carried by the body provides a removable closure or cage for retaining the ball-like element and line in the recess and bore respectively to permit the fish lure to rotate relative to the line. The other end of the receiver shaft is provided with an "O" ring to which the lure is securely attached. This construction permits or allows for instant line-lure connection and permits even a novice to rapidly exchange the lure on the line when required by (a) compressing the spring, (b) removing the ball-like element and line from the combined swivel and lure, and (c) thereafter connecting the element and line to a different swivel to which another lure is attached.

U.S. Pat. No. 5,054,230

Inventor: Stephen Woodman

Issued: 8, Oct. 1991

A minimally perforated, reusable, water pressure activated, slow release fish attractant chum dispenser, for deep sea and shallow water fishing; in combination with a 100% natural fish attracting chum, all of which, in combination, perform as an integral device to the process of fishing with a baited hook or fishing jig or fishing lure, when attached concentrically to the fishing line, or in relative position to the fishing line by use of a trailer of fishing line attached to the main retrieval fishing line, so as, to prevent accidental loss of the dispenser or bottom closure, without the accidental separation of said fishing line from the fishing rig.

U.S. Pat. No. 5,216,829

Inventor: Peter Morton

Issued: 8, Jun. 1993 fish bait intended mainly for use in long line fishing is constituted by a natural bait material, such as fish, squid, shellfish, fish offal, dehydrated or freeze dried fish meal and/or fish oil (3) enclosed in a porous casing (1,2). The casing, which surrounds the entire bait, is made of a layer of semi-permeable membrane (1) and a layer of mesh reinforcement (2). The membrane preferably is a collagen based material which allows fish oil and aroma constituents of the natural bait (3) to permeate into the surrounding water to attract fish. The reinforcing mesh, which preferably is made from a knitted cotton tubular bandage material, provides stability for the bait package, and ensures that the bait package is retained on a hook (5).

U.S. Pat. No. 5,319,875

Inventor: Giuseppe Brandolino

Issued: 14 Jun. 1994

A cage lure for attachment to a fishing hook and a fishing line, and for containing bait is disclosed. The cage lure comprises a bait enclosure bag having a flexible meshed construction; a dual spring closure means for closing the open end of the bait enclosure bag; a leader having openable attachment rings, the rings adapted for attachment, in use, to the fishing line and the fishing hook; and means for releasably attaching the bait enclosure bag to the leader, the attachment means comprising at least two loops.

U.S. Pat. No. 5,355,616

Inventor: Michael Parker

Issued: 18, Oct. 1994

A fishing rig for sport fishing applications. The fishing rig comprises a hollow cylinder having a top end and a bottom end. A top cap is removably coupled to the top end. A bottom cap is removably coupled to the bottom end. The apparatus includes a first top swivel removably coupled to the top cap for receiving a fishing line. The fishing rig further includes a second top swivel which is removably coupled to the top cap in diametrical opposition to the first top swivel. A bottom swivel and hook is removably coupled to a swivel at the bottom end cap. A metal crimped-sleeve leader and hook is operatively coupled to the second top swivel.

U.S. Pat. No. 6,354,037

Inventor: William Coppola, Jr.

Issued: 12, Mar. 2002

A fishing lure with an internal bait storage cavity is provided. The fishing lure includes a removable, rigid, plate to securely confine the bait within the lure body cavity, even when subjected to a fish bite. The surrounding water is permitted to immerse the bait within the cavity through smaller holes in the lure body. The lure body is formed and painted to resemble a fish. Eyelets are positioned at both ends of the lure body to enable fishhooks to be attached at either one or both ends of the lure body. A coated wire is positioned axially within the lure body and is coupled at each end to an eyelet to ensure that the hook remains linked to the fishing line in the event the lure body is damaged.

U.S. Pat. No. 6,557,293

Inventor: Ray Klapka

Issued: 6, May 2003

A bait-holding lure made of a front element, a rear element spaced-apart from the front element, a cage, defined by spaced-apart front open end and rear open end, the cage arranged between the front element and the rear element, the cage having a hollow interior forming a cavity for retaining a quantity of bait therein, the cage further defined by a perforated, contoured outer wall throughwhich water may flow to carry the taste and scent of the bait into the surrounding water, and a spindle containing a straight portion arranged to pass axially through the cage, a first aperture formed in the front element, and a second aperture formed in the rear elements to hold them in axial alignment, the spindle further including a return bend forming one end of a bent segment spaced-apart from the spindle, the segment containing a bend and a hamulus for connection to the spindle under bias pressure from the return bend to hold the front element, the cage, and the rear element in close assembled formation on the spindle.

UK Patent Number GB21,619

Inventor: Simeon Mogg Vinten

Issued: 8, Sep. 1910

A lure designed to combine as far as possible the merits of the wobble and the spin to attract game fish.

UK Patent Number GB1,401,796

Inventor: Reginald George Mounsey

Issued: 28, Sep. 1971

A chum pot comprising a rigid cylindrical foraminous open ended sleeve providing the principal body portion of the stated chum pot, rigid closures mounted on and closing the respective otherwise open ends of said sleeve, one of said closures being a cap which is readily applicable and removable to permit chum to be placed within the confines of said sleeve, said cap having a flattened circular portion with an axial opening therein and a marginal annular laterally projecting flange, said flange externally embracing the adjacent end portion of said sleeve and embodying a plurality of gripping fingers frictionally engaging the end portion of the sleeve, the other closure having an axial opening aligned with the axial opening in said cap, and a rigid one-piece elongated rod passing axially and completely through said sleeve and through the axially aligned openings provided therefor in said closures, said rod being of a length greater than the length of said cylinder and having an eye formed at each end thereof, the eyes being disposed outwardly of the respective closures and being of a size greater than the diameter of the axial openings so that the eye on the cap equipped end of said sleeve constitutes an abutment which is engageable with said cap.

While these fishing lure devices may be suitable for the purposes for which they were designed, they would not be as suitable for the purposes of the present invention, as hereinafter described.

SUMMARY OF THE PRESENT INVENTION

The present invention discloses a fishing lure having a cage that water can move through with movable elements therein which are free to move laterally and transversely within the case. When placed in a medium such as water, the beads banging into each other and the cage 16 generate sound waves that radiate from the lure, attracting game fish. The cage can vary in shape, such as cylindrical or polygonal but preferably cylindrical. In addition, varying the materials used for the beads, such as glass and metal would cause the beads to vary an activity.

A primary object of the present invention is to provide a fishing lure having a housing with a plurality of movable elements within said housing.

Another object of the present invention is to provide a fishing lure wherein said housing is a cage.

Yet another object of the present invention is to provide a fishing lure that comprises a cage housing with a fishing line attachment eye at one distal end and a fishing hook at its other distal end.

Still yet another object of the present invention is to provide a fishing lure having a cage wherein said movable elements are free to move laterally and transversely within the cage.

Another object of the present invention is to provide a fishing lure wherein said movable elements are beads, Yet another object of the present invention is to provide a fishing lure wherein said bead are made from hard materials, such as metal and glass.

Still yet another object of the present invention is to provide a fishing lure that when placed in a medium such as water, the beads banging into each other and the cage generate sound waves that radiate from the lure, attracting game fish.

Another object of the present invention is to provide a fishing lure that the cage can vary in any shape, such as cylindrical or polygonal but is preferably cylindrical.

Yet another object of the present invention is to provide a fishing lure wherein varying the materials used for the beads, such as glass and metal would cause the beads to vary in activity.

Additional objects of the present invention will appear as the description proceeds.

The present invention overcomes the shortcomings of the prior art by providing a fishing lure having a cage with movable elements therein, which are free to move laterally and transversely within the cage. When placed in a medium such as water, the beads banging into each other and the cage generate sound waves that radiate from the lure, attracting game fish. The cage can vary in any shape, such as cylindrical or polygonal but is preferably cylindrical. Varying the materials used for the beads, such as glass and metal would cause the beads to vary in activity.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
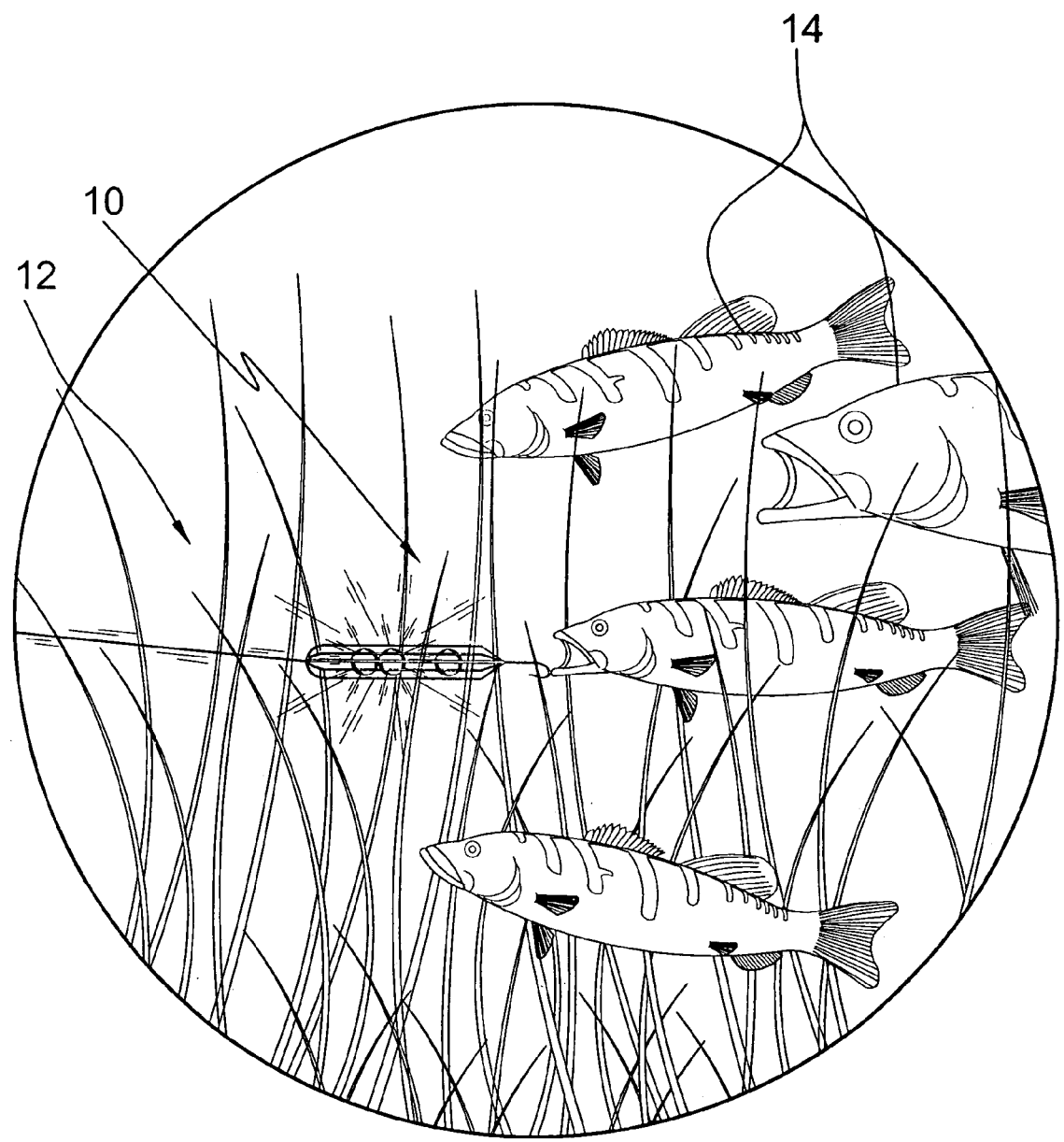
FIG. 1 is an illustrative view of the present invention in use.

With regard to reference numerals used, the following numbering is used throughout the drawings.

10 present invention
12 water
14 fish
16 cage
18 hook
20 beads
22 sound waves
24 eye

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention in use. The present invention 10 is a fishing lure having a cage with movable elements therein, which are free to move laterally and transversely within the cage. When placed in a medium such as water 12, the beads banging into each other and the cage generate sound waves that radiate from the lure, attracting game fish 14. The cage can vary in shape, such as cylindrical or polygonal but is preferably cylindrical. Varying the materials used for the beads, such as glass and metal would cause the beads to vary in activity.

Figure 2:
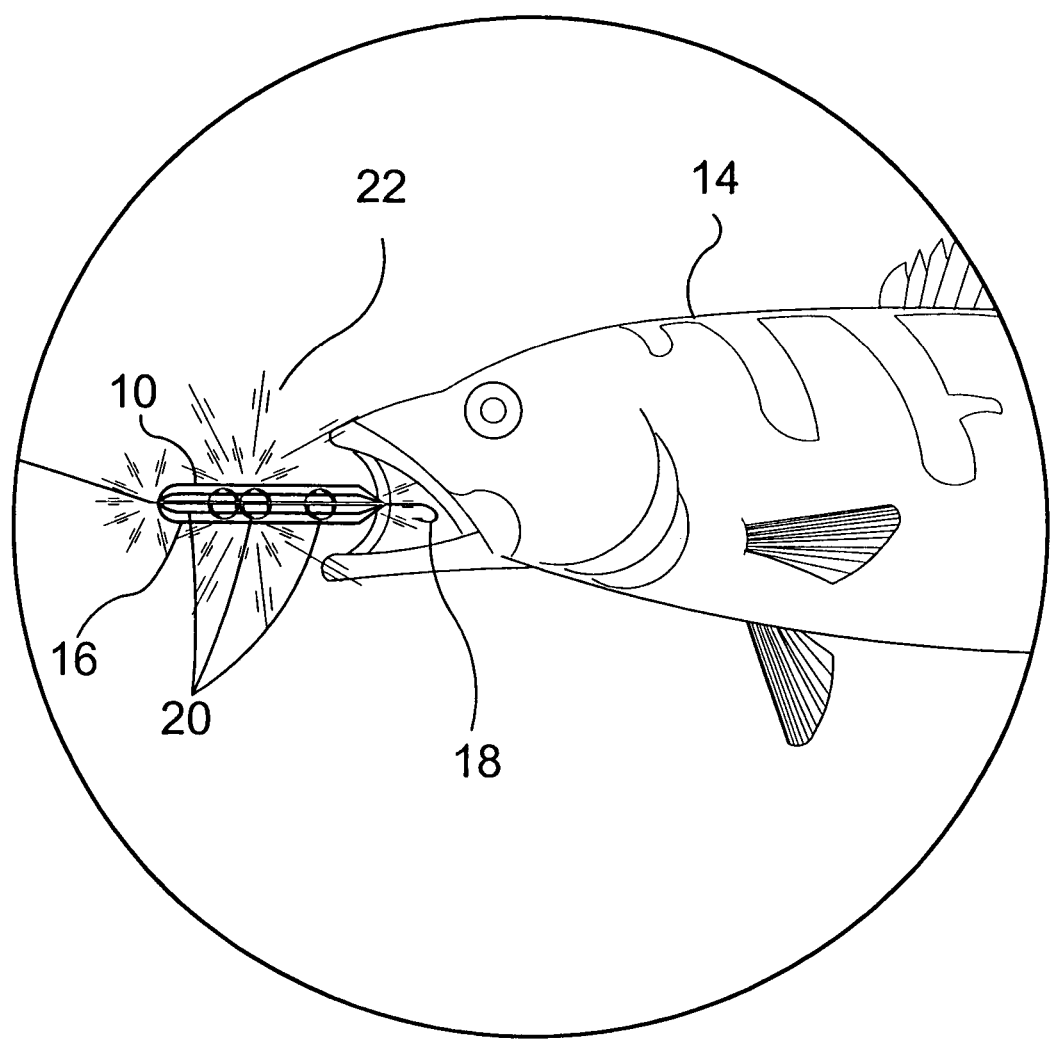
FIG. 2 is an illustrative view of the present invention in use.

Turning to FIG. 2, shown therein is an illustrative view of the present invention 10 in use. Shown is the present invention 10 disclosing a fishing lure having a cage 16, which may be elongated, spaced away from the hook 18 with a plurality of objects or beads 20 within the cavity of the cage. The beads 20 act as a sound wave attractant as shown at 22 rattling as the lure is retrieved by the user. The device 10 is designed to attract game fish 14 to the lure by sight and sound senses. The objects 20 are loosely confined and movable within the cage 16 because the diameter of the cage is greater than the diameter of the objects.

Figure 3:
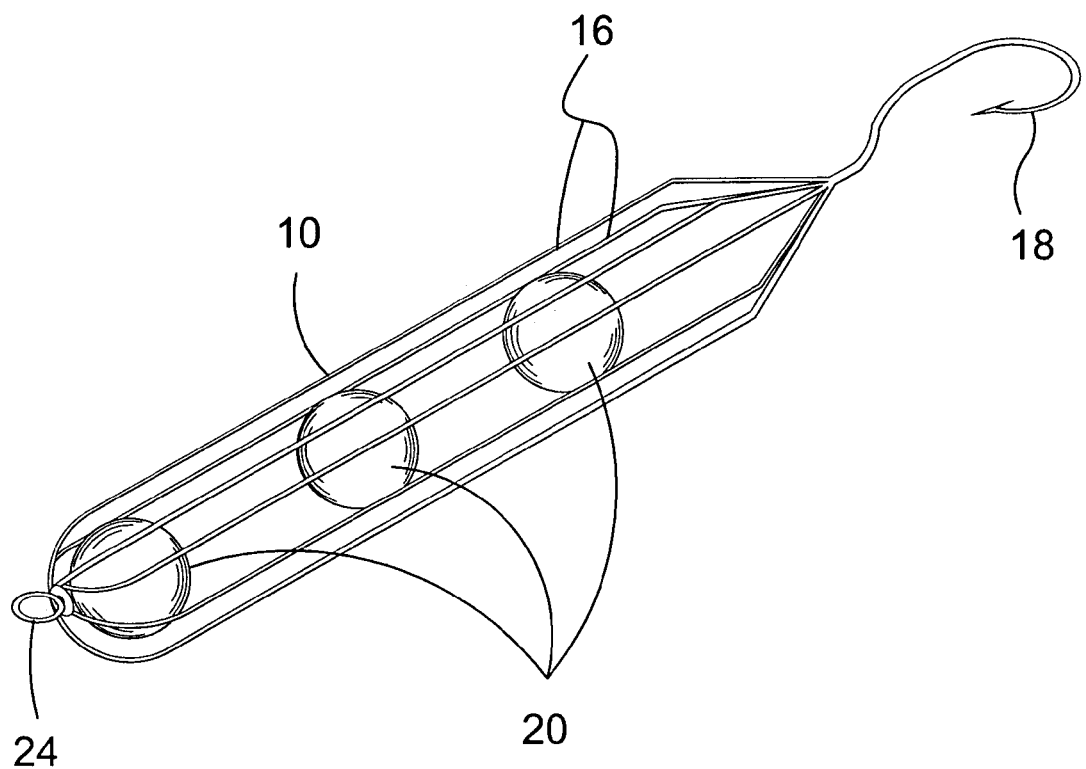
FIG. 3 is a perspective view of the present invention.

Turning to FIG. 3, shown therein is a perspective view of the present invention 10. Shown is a perspective view of the present invention 10 disclosing a fishing lure having a cage 16 with movable elements 20 therein which are free to move laterally and transversely within the cage and may create a rattling sound. A connector or eye 24 is provided as an integral part of the lure, allowing the user to tie a distal end of fishing line thereto. A hook 18, which may be integrally constructed with the cage 16, is provided and can vary in style and function according to its use. The cage 16 can be of a variety of sizes and varying shapes, but the preferred shape is cylindrical.

Figure 4:
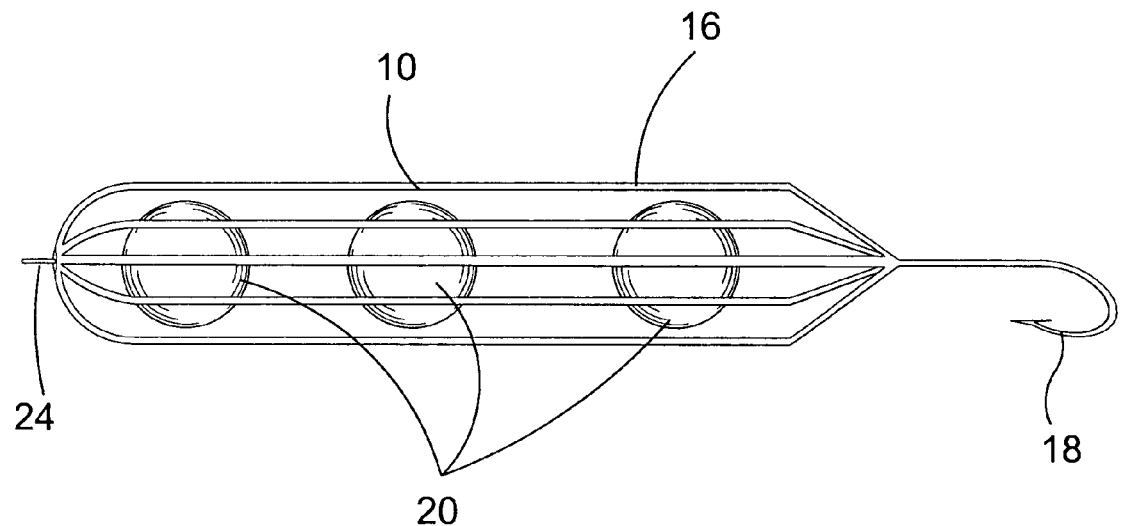
FIG. 4 is a side view of the present invention.

Turning to FIG. 4, shown therein is a side view of the present invention 10. Shown is a side view of the present invention 10 disclosing a fishing lure having a cage 16 spaced away from the hook 18 with a plurality of beads 20 within the cage. The beads 20 act as a sound attractant, rattling as the lure is retrieved by the user. The device 10 is designed to attract game fish to the lure by sight and sound senses. An eye 24 is also provided.

Figure 5:
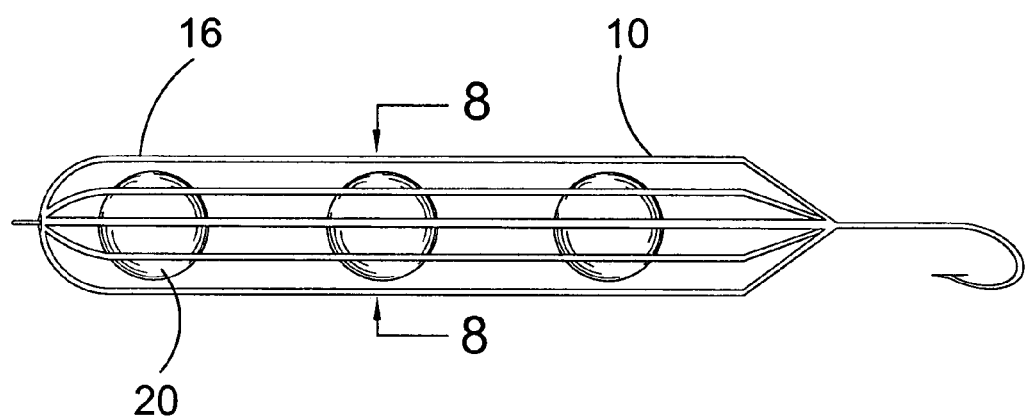
FIG. 5 is a side view and locator of the present invention.

Turning to FIG. 5, shown therein is a side view and locator of the present invention 10. Shown is a side view of the present invention 10 disclosing a plurality of beads 20 which are captive within the lure cage 16. The beads 20 act as a sound attractant, rattling as the lure is retrieved by the user. The beads 20 can be of varying material such as glass, plastic or metal. The arrows show a cross sectional cut illustrated on FIG. 8.

Figure 6:
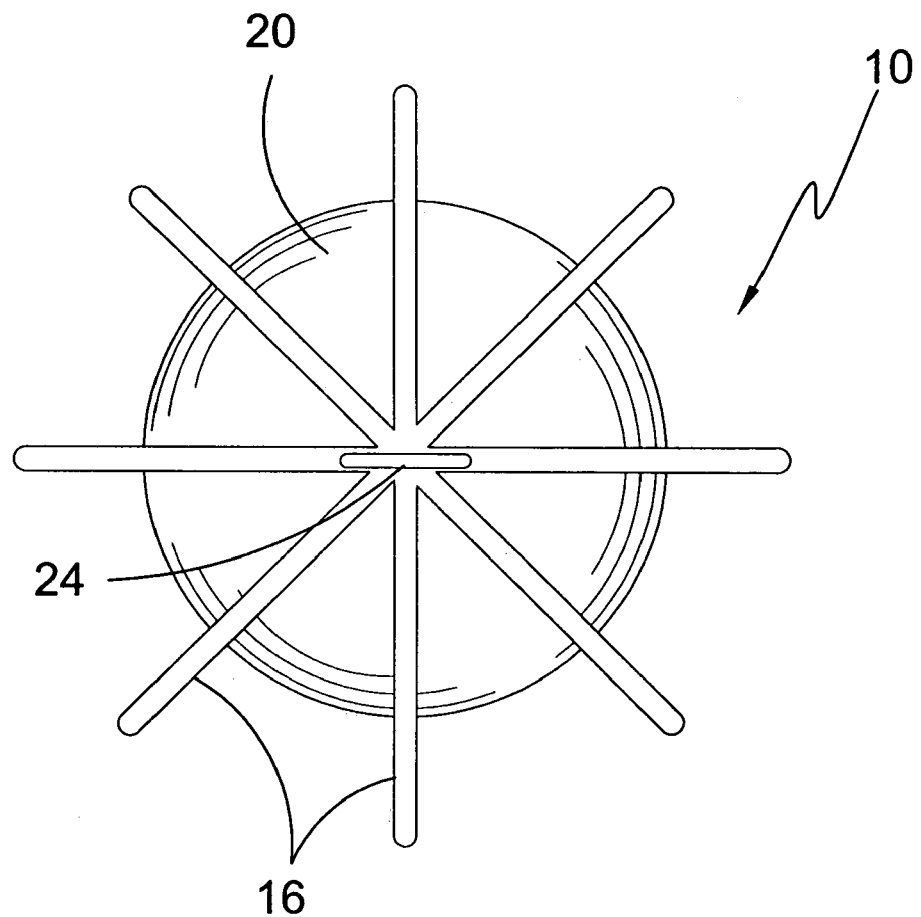
FIG. 6 is a front view of the present invention.

Turning to FIG. 6, shown therein is a front view of the present invention 10. Shown is a frontal view of the present invention 10 disclosing a fishing lure having a cage 16 spaced away from the hook with a plurality of beads 20 within the cage that are free to move laterally and transversely within the cage. When in use, the beads 20 bang into each other as the lure cage 16 is retrieved, generating sound waves that radiate from the lure. Also shown is eye 24.

Figure 7:
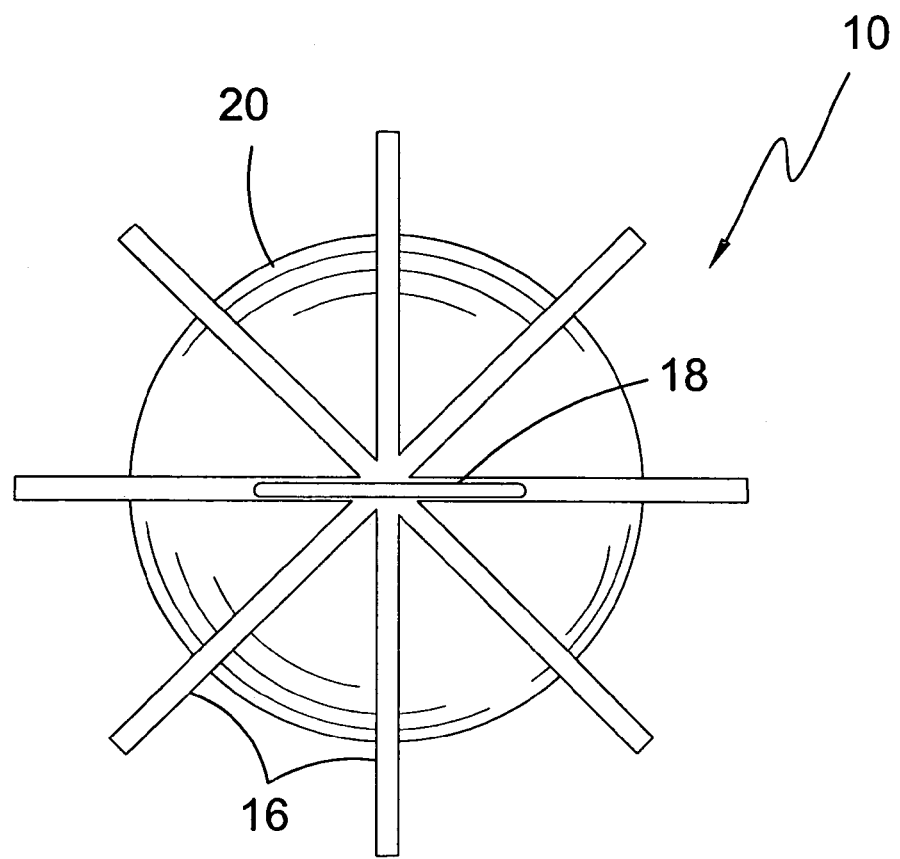
FIG. 7 is a rear view of the present invention.

Turning to FIG. 7, shown therein is a rear view of the present invention 10. Shown is a rear view of the present invention 10 disclosing a fishing lure having a cage 16 with movable beads 20 therein, which are free to move within the cage in such a way as to bang up against each other causing sound waves that radiate from the lure. The device is designed to attract game fish. Hook 18 is also shown.

Figure 8:
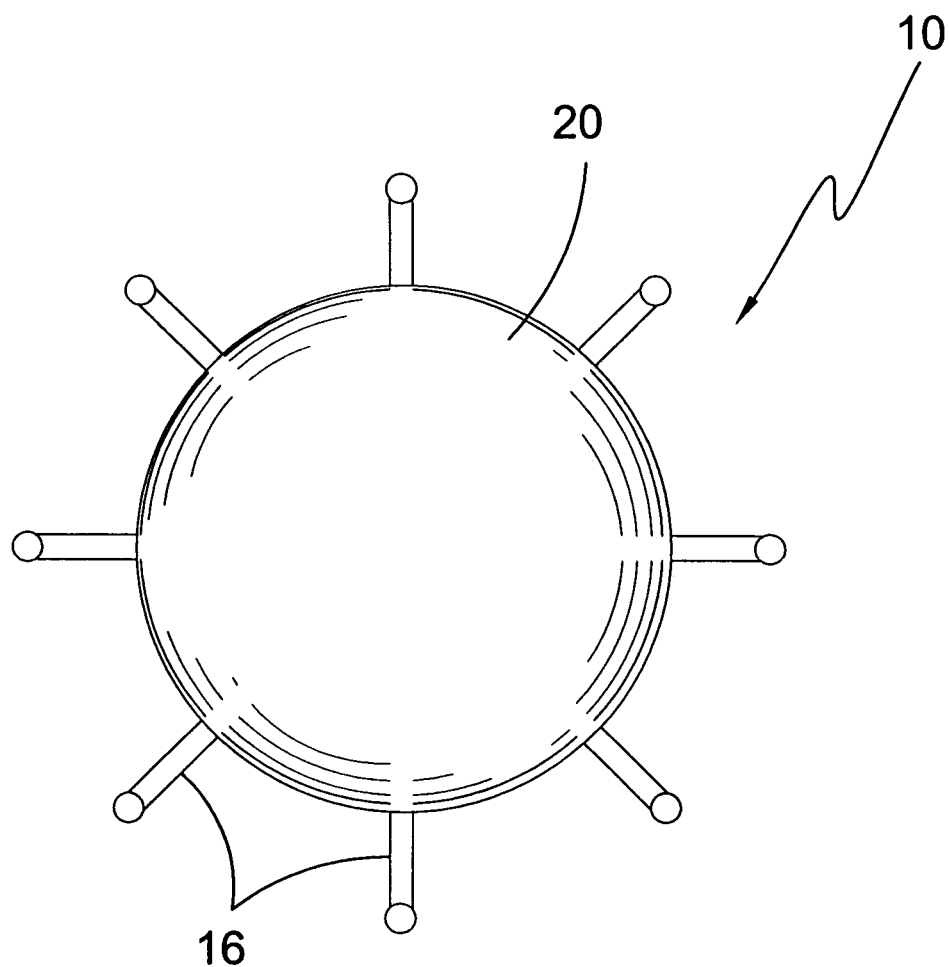
FIG. 8 is a cross sectional view of the present invention.

Turning to FIG. 8, shown therein is a cross sectional view of the present invention 10. Shown is a cross sectional view of the present invention 10 disclosing a fishing lure having a cage 16 spaced away from the hook with a plurality of beads 20 within the cage. The beads 20 act as a sound attractant, rattling as the lure is retrieved by the user. The device 10 is designed to attract game fish to the lure by sight and sound senses.

Figure 9:
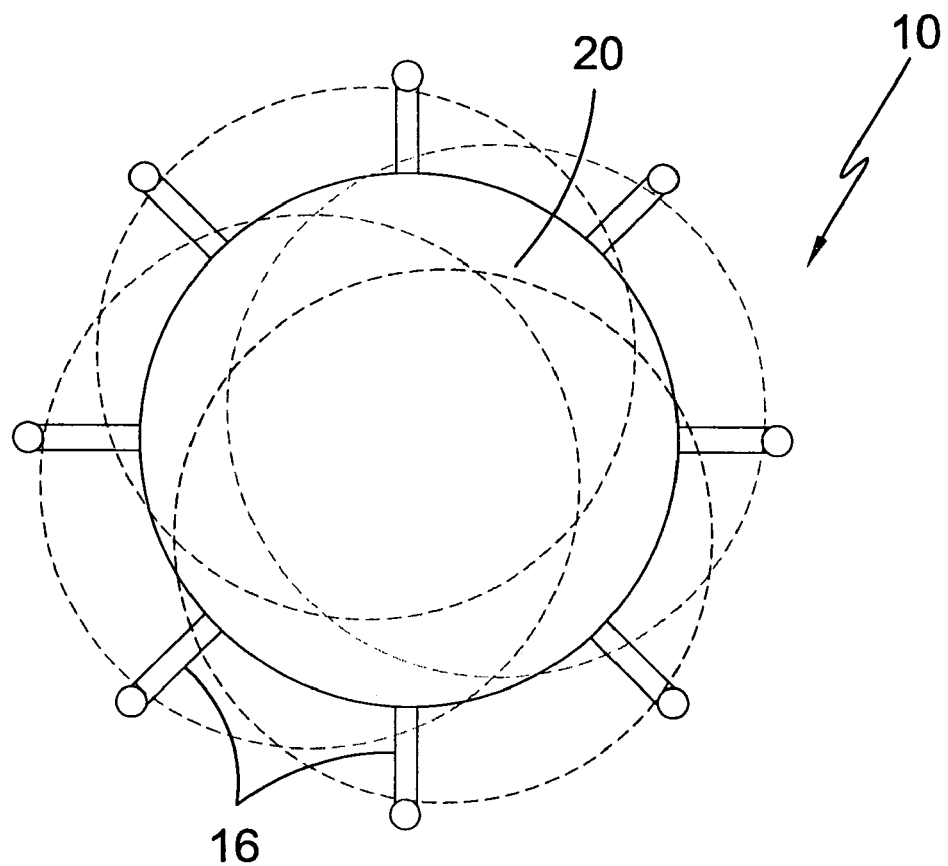
FIG. 9 is a cross sectional view of the present invention.

Turning to FIG. 9, shown therein is a cross sectional view of the present invention 10. Shown is a cross sectional view of the present invention 10 having the beads 20 moving within the fishing lure cage 16. The beads 20 act as a sound attractant, rattling as the lure is retrieved by the user. The device 10 is designed to attract game fish to the lure by sight and sound senses.

Figure 10:
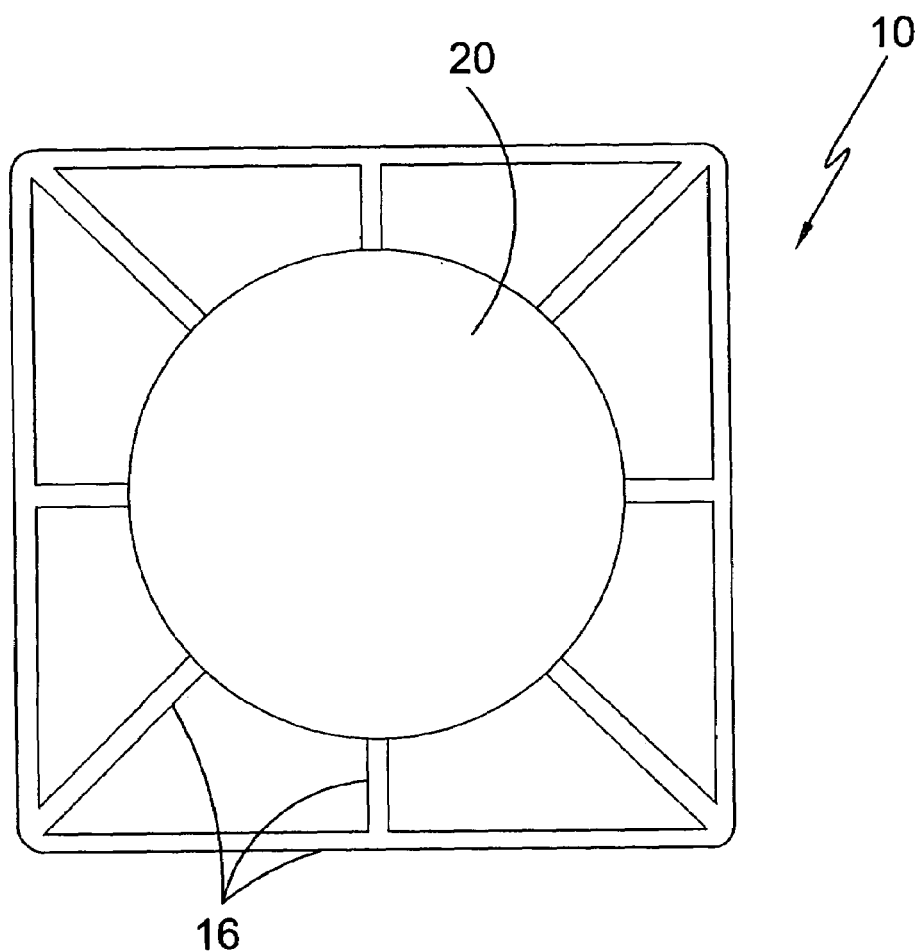
FIG. 10 is a sectional view of a rectangular shape cage of the present invention.

Turning to FIG. 10, shown therein is a sectional view of a rectangular shape cage of the present invention 10. Shown is a sectional view of a rectangular shaped cage 16 having beads 20 within the fishing lure cage. The cage 16 can be of any shape, such as cylindrical or polygonal but is preferably cylindrical.

I claim:

1. A fishing lure for attachment to the end of a fishing line for use in catching fish, comprising:
   a) a cylindrical cage having first and second opposing ends, said cage having a cavity of substantially uniform diameter therein, said cage made up of wire like elements extending a full length of said cage without any intersecting cross members extending transversely to said wire like elements so that water can flow freely through said cage, the first end of said cage having said wire like elements converging to form a rounded shape and said wire like elements converging at the second end to form a point;
   b) a plurality of spherical objects being disposed in said cavity, said objects being loosely confined in said cage, said objects being movable in said cage so that said objects strike each other producing sound as the fishing lure moves through the water, said cylindrical cage having a greater diameter than the diameter of each said object but a diameter not large enough to allow said spherical objects to pass each other whereby said objects create a rattling sound as the fishing lure moves through the water;
   c) a connector being disposed on said first end of said cage for attachment to a fishing line; and,
   d) a fish hook being disposed on said second end of said cage to permit a fish to be hooked as the fish strikes the fishing lure.

2. The fishing lure of claim 1, wherein said objects are beads.

3. The fishing lure of claim 1, wherein said objects are made of glass.

4. The fishing lure of claim 1, wherein said objects are made of plastic.

5. The fishing lure of claim 1, wherein said objects are made of metal.

6. The fishing lure of claim 1, wherein said connector is an eye.

7. The fishing lure of claim 1, wherein said fish hook is integrally formed with said cage.

* * * * *